Jan. 24, 1956   J. L. CUNNINGHAM, SR., ET AL   2,732,067
WEIGHING AND CLASSIFYING APPARATUS
Filed April 21, 1954   3 Sheets-Sheet 1
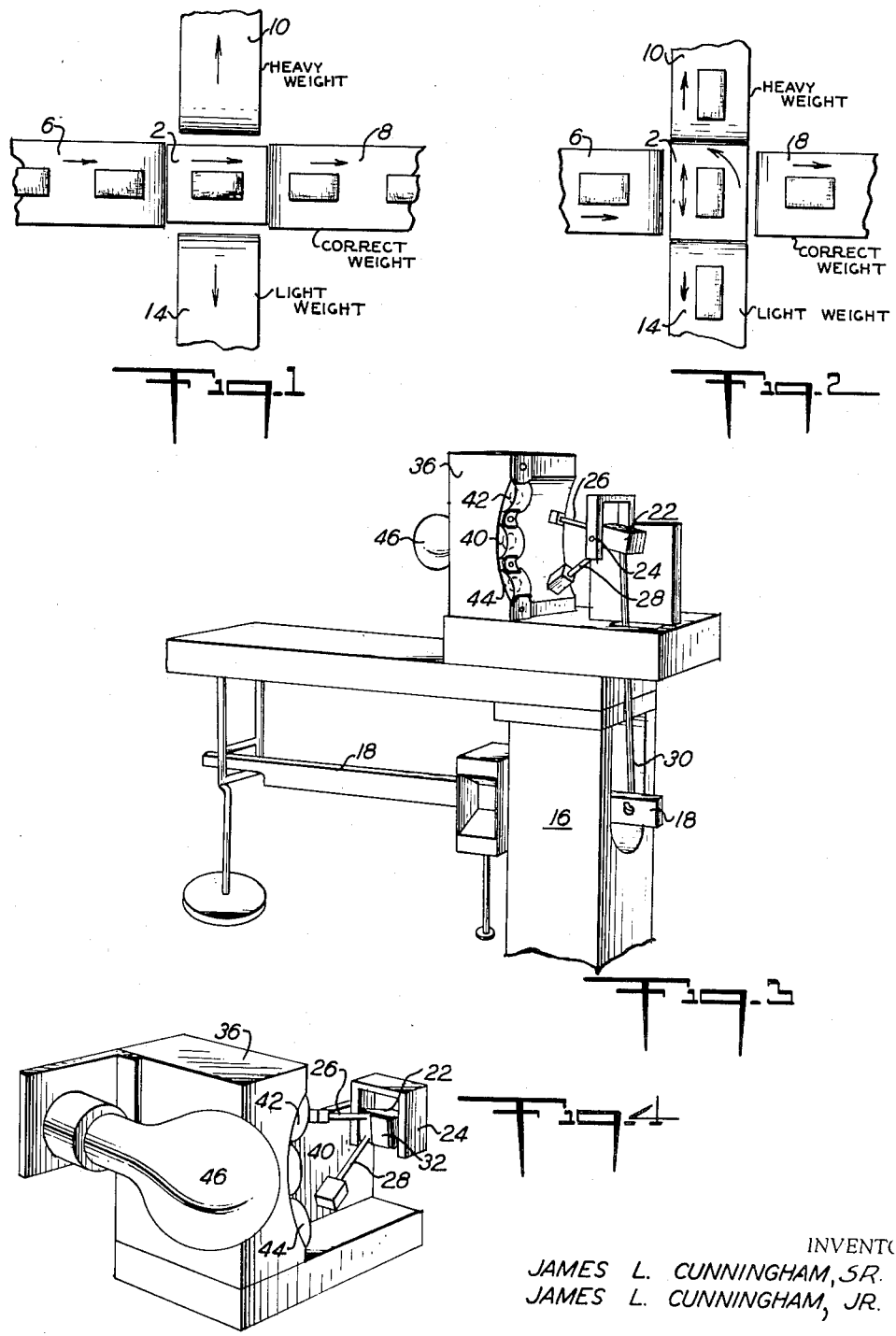
INVENTORS
JAMES L. CUNNINGHAM, SR.
JAMES L. CUNNINGHAM, JR.
BY Robert U. Geib, Jr.
ATTORNEY

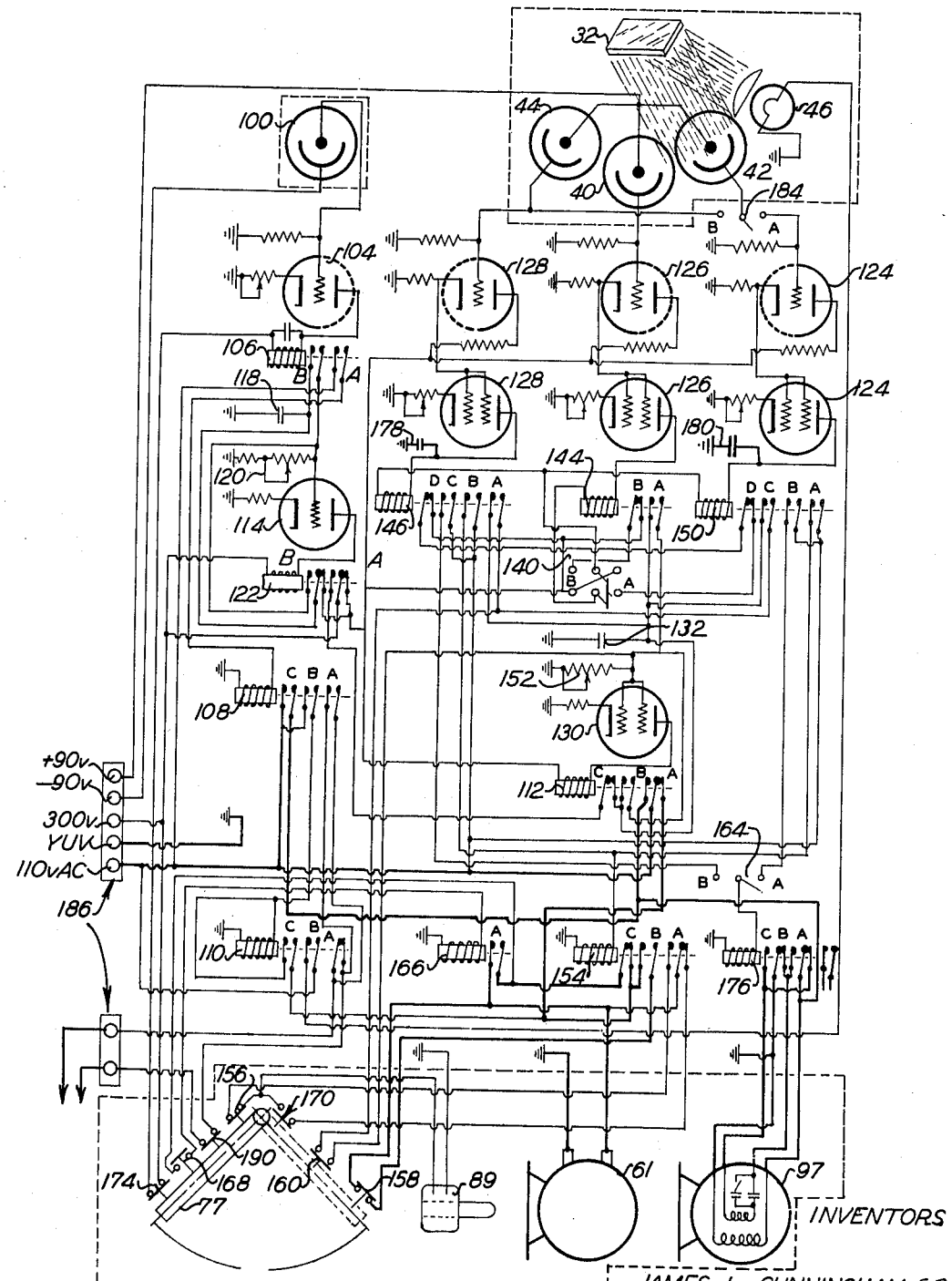

Jan. 24, 1956   J. L. CUNNINGHAM, SR., ET AL   2,732,067
WEIGHING AND CLASSIFYING APPARATUS
Filed April 21, 1954   3 Sheets-Sheet 3

INVENTORS
JAMES L. CUNNINGHAM, SR.
JAMES L. CUNNINGHAM, JR.
BY Robert U. Geib, Jr.
ATTORNEY

United States Patent Office 2,732,067
Patented Jan. 24, 1956

2,732,067

WEIGHING AND CLASSIFYING APPARATUS

James L. Cunningham, Sr., and James L. Cunningham, Jr., Augusta, Ga.

Application April 21, 1954, Serial No. 424,731

8 Claims. (Cl. 209—121)

This invention relates to apparatus for weighing and classifying articles of various kinds; and more particularly to apparatus of the type which perform the weighing operation and then move the article in a certain direction according to whether its weight is within certain tolerances, or is too light, or too heavy.

More specifically, the apparatus of the present invention is constructed and arranged to sensitively check-weigh various commodities in a system wherein such commodities continuously travel in single successive order longitudinally, and in a more or less horizontal path, toward and onto a commodity-receiving member on a weighing scale, the system being such that articles of a desired and predetermined weight range will be caused to follow a selected course of discharge from the apparatus, while articles or commodities possessing weights other than those of said desired weight range will follow one or more different courses of discharge, thereby providing for the separation of under and over weight articles from those of the desired weight.

While there have been numerous attempts in the past to provide efficient apparatus of this general type, the ones of which we are aware are objectionable for one reason or another, including lack of sensitivity, slowness in operation, high initial cost and/or cost of maintenance.

It is, accordingly, one of the objects of the present invention to provide an automatic check-weighing and classifying apparatus which is highly accurate and responsive to minute weight variations in the articles being handled in separating over or underweight articles from those of a desired and predetermined weight range; to provide in such apparatus a weighing scale mechanism having a motor-driven conveyor receiver for the articles to be weighed thereon, the receiver being so constructed as to support its conveyor and the motor means for driving the same; to provide an improved electro-responsive control actuated by the movable beam or lever of the weighing mechanism for controlling the operation of the classifying means which causes under and overweight articles to follow a different course of discharge from the apparatus than those which are within the desired weight range; and to provide apparatus of the class described which is of simple, positive and reliable construction, and which may be used for extensive intervals of operation without requiring undue manual attention, adjustment or repair.

The invention, then, comprises the features hereinafter fully described and as particularly pointed out in the claims, the following description and the annexed drawings setting forth in detail certain illustrative embodiments of the invention, these being indicative of one of several ways in which the principles of the invention may be employed.

In said drawings:

Figures 1 and 2 are schematic plans generally illustrating the manner in which the apparatus of the present invention is intended to operate;

Figures 3 and 4 are fragmentary perspectives illustrating certain portions of the photoelectric system which is operated by the beam of the weighing scale;

Figure 7 is a wiring diagram.

Figure 5:
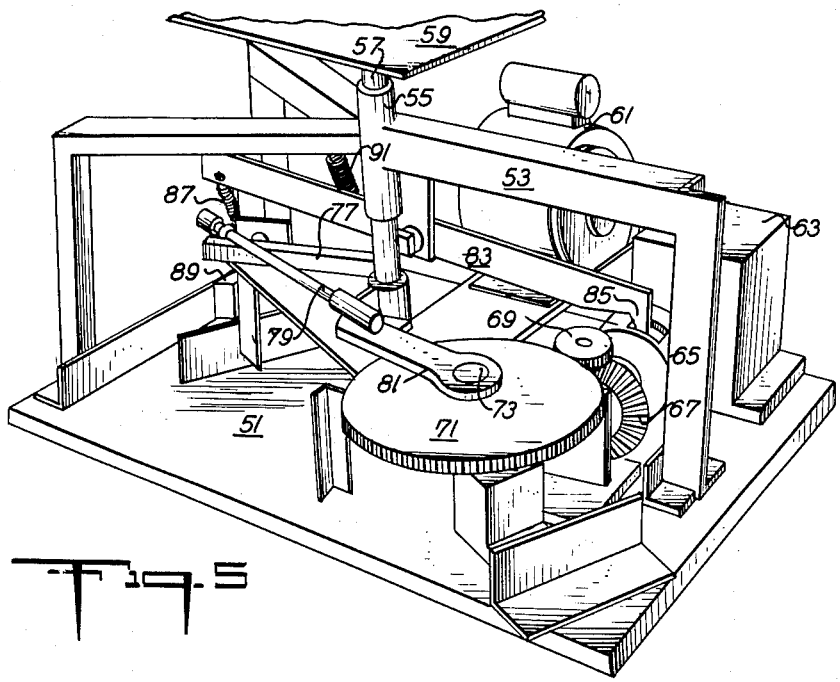
Figures 5 and 6 are fragmentary perspectives of the scale-carried conveyor, the apparatus for driving said conveyor and the apparatus by means of which it is made to assume the positions illustrated in Figures 1 and 2.

Referring more particularly to the drawings, the numeral 2 generally designates a comparatively short endless conveyor which comprises the usual upper and lower flights, or belts, which are trained over, and supported on, a pair of spaced rotatable rollers 4.

As referred to hereinbefore, this comparatively short endless conveyor 2 is carried upon the bed or weighing platform of a suitable scale in order that articles A which are carried thereby may be weighed. The said articles A are transferred onto the endless conveyor 2 (which is then being driven) by a power-driven feed-in table or conveyor 6, as shown in Figures 1 and 2. According to the teachings of the present invention, the endless conveyor 2 is stopped during the weighing operation (to thereby permit of greater accuracy) and, in the event the article is found to be within an acceptable weight range or tolerance, the endless conveyor 2 is again actuated to forwardly feed the article onto an (acceptable-weight) discharge conveyor 8 which may, if desired, be of a gravity type. In the event the weight of the article is either too heavy or too light, the endless conveyor 2 and its associated supporting and driving instrumentalities are rotated 90° in a counter-clockwise direction as viewed in Figure 1, and thereby made to assume the position which is schematically illustrated in Figure 2. If the weighed article is too heavy, the endless conveyor 2 is actuated to move in its original forward-feeding direction to thereby discharge the overweight article onto an "overweight" conveyor 10. If, on the other hand, the weighed article is too light, the endless conveyor 2, while still in the position of Figure 2, is driven backwardly to move the underweight article onto an "underweight" conveyor 14.

The weighing scale is generally illustrated at 16 in Figure 3 as being of the well-known platform type which is used for general purpose weighing; but it will be understood by those skilled in the art that other types of scales may, if desired, be substituted therefor. The platform-type scale 16 is provided with a horizontal weight-beam 18, one end of which extends outwardly therefrom as shown in Figure 3.

Disposed above the outwardly extending end of the horizontal weight-beam 18 is a pendulum 22 which is supported on a horizontal shaft 24 and provided with a pair of divergent upper and lower weighted arms 26 and 28.

The outwardly extending end of the horizontal weight-beam 18 is connected to the pendulum 22 by a link 30.

Disposed between the upper and lower weighted arms 26 and 28, respectively, of the pendulum 22 is a mirror 32 which normally faces in a generally horizontal direction above and parallel to the horizontal weight-beam 18.

A housing 36 is mounted atop the platform scale 16 in close adjacency to the weighted arms 26 and 28 of the pendulum 22; and this housing supports three superposed photoelectric tubes, the center photoelectric tube being indicated at 40 and the upper and lower ones at 42 and 44, respectively.

A light-source 46 is mounted on the far side of the housing 36 so as to cause light rays not to directly impinge upon the photoelectric tubes 40, 42 and 44, but to be reflected from the mirror 32 on the weighted pendulum 22.

According to the foregoing construction and arrangement, the weight of an article upon the platform of the scale 16 will determine which of the three photoelectric tubes 40, 42 and 44 is to be sensitized; and these will, in a manner to be described more fully hereinafter, respectively actuate the conveying instrumentalities for the "correct weight," "overweight" and "underweight" categories.

Figure 6:
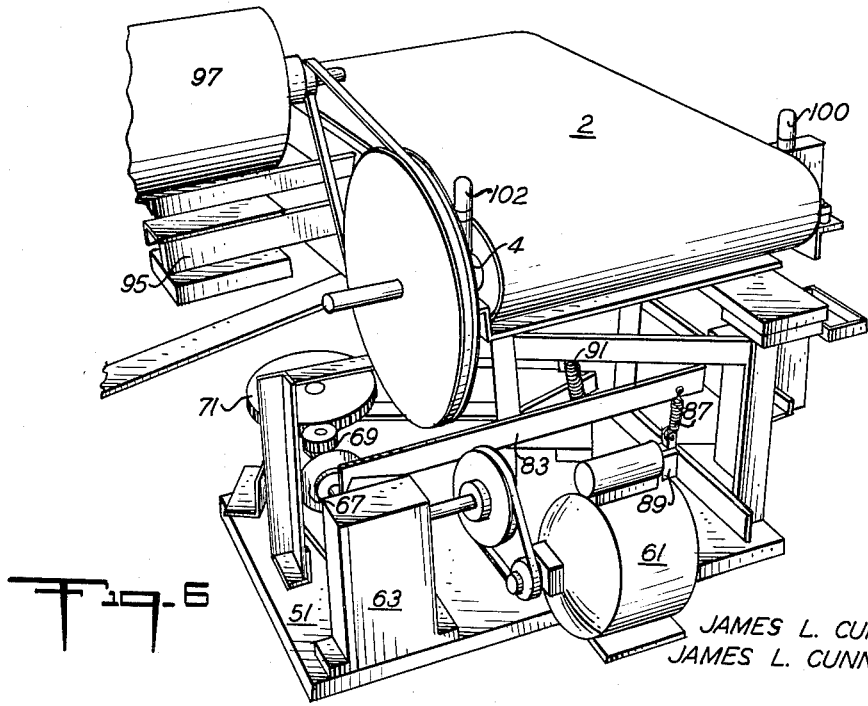

Referring to Figures 5 and 6, the bed or weighing platform of the scale 16 is shown at 51; and mounted upon it is a frame 53 which provides a guide 55 for a vertically extending rotatable shaft 57. The lower end of this vertically extending rotatable shaft is provided with a suitable anti-friction bearing; and its upper end carries a turntable 59 which, in turn, supports the rollers 4 of the endless belt-type conveyor 2.

An electric motor 61 is shown as mounted upon the bed or weighing platform 51 of the scale. It will be understood, however, that this electric motor 61 may be mounted elsewhere, such as upon the underside of the turntable 59. The drive shaft of the electric motor 61 is connected, through a belt-and-pulley drive or otherwise, to the driving shaft of a gear reduction unit 63; and the driven shaft of this gear reduction unit drives a clutch 65 and, through it, a bevel gear 67.

The clutch 65 may acceptably take a number of different forms, but is shown as being of the very well-known type which comprises a trip-lever (not shown) actuated by a dog which is carried by an adjacently disposed operating lever.

A small gear 69 is disposed to mesh with the bevel gear 67, and also with a considerably larger gear 71 which is secured to a vertical shaft 73.

A horizontally extending arm 77 is secured to the vertically extending turntable shaft 57; and its outer end is connected, through a link 79, with the outer end of a crank 81 which is secured to the aforementioned vertical shaft 73 (carrying the large gear 71).

Besides being utilized to effect the movement of the turntable 59, the horizontal arm 77 on the turntable shaft 57 effects the operation of various electrical switches, as will later appear.

A generally horizontal lever 83 is pivotally mounted intermediate its ends so as to extend over the clutch 65 which, as beforementioned, is interposed between the gear reduction unit 63 and the bevel gear 67.

As shown most clearly in Figure 5, one end of the generally horizontal lever 83 is provided with a dog 85 for coaction with its associated clutching element in the clutch 65.

The other end of the generally horizontal lever 83 carries a depending link 87 which is connected to the operating element of a solenoid 89, the latter being shown for convenience as being mounted on the (lower) frame 53 adjacent the scale platform 51.

A spring 91 so influences the generally horizontal lever 83 that the dog 85 tends to ride the periphery of the clutch 65.

According to the immediately foregoing construction and arrangement, when the solenoid 89 is energized, the dog 85 on the generally horizontal lever 83 is raised; and the clutch 65 is thereby engaged to cause the electric motor 61 (through the gear reduction unit 63) to drive the bevel gear 67. This, in turn, causes the gears 69 and 71 to drive the crank 81 and link 79 to move the horizontal arm 77 and rotate the vertical turntable shaft 57.

Once the clutch 65 is actuated and the large gear 71 commences to rotate, the solenoid 89 is deenergized (in a manner which will be described hereinafter), thus permitting the dog 85 on the lever 83 to ride the peripheral surface of the clutch 65.

When the clutch 65 makes one complete revolution, or a 360° turn, the large gear 71 makes a 180° turn. Thus, when the elements of the apparatus of the present invention are in the normal or "acceptable weight" position, the clutch 65 must make a 360° turn to bring the large (crank-operating) gear 71 to the position corresponding to a "reject" position (i. e., underweight or overweight); that is, the first 180° turn of the large gear 71. The horizontal arm 77 on the turntable shaft 51 moves only 90°, while the large (crank) gear moves 180°.

Referring to Figure 6, the turntable 59, or its shaft 57, carries an outrigger 95 upon which there is mounted an electric motor 97. The drive shaft of this electric motor 97 is connected, through a belt-and-pulley drive or otherwise, with one of the rotatable rollers 4, around which the belt of the endless conveyor 2 is trained. If desired, a gear reduction unit (not shown) may be interposed in this driving arrangement between the motor 97 and one of the rollers 4.

When the horizontal arm 77 on the turntable shaft 57 is in the "reject" position (i. e., for either an overweight or underweight article), the conveyor motor 97 is actuated to eject the rejected article from the endless conveyor 2; and, after it has been ejected, the turntable motor 61 and solenoid 89 are reenergized (in a manner which will be later described) whereby the large (crank) gear 71 moves the turntable arm 77 and turntable 59 through a 90° arc back to the normal or acceptable weight position.

The turntable 59 carries at one side thereof a triggering photoelectric tube 100 and on the other side a light source 102 which is trained thereon. As an article to be weighed moves onto the (scale supported) endless conveyor 2, it interrupts the light source 102 and institutes the operation of the apparatus, as will appear hereinafter.

THE ELECTRONIC SYSTEM

On Figure 7 of the drawings, there is shown a preferred form of wiring diagram for enabling the automatic operation of the various elements of the apparatus of the invention. However, it will be appreciated by those skilled in the art that other wiring diagrams or electronic systems may be substituted therefor, either wholly or in part.

According to the diagram of Figure 7, as an article to be weighed moves from the power-driven conveyor table 6 and onto the endless (scale supported) conveyor 2, thereby interrupting the flow of light onto the triggering photoelectric tube 100, the latter becomes deactivated to, in turn, activate a D. C. amplifier tube 104 which energizes a triggering relay 106. Upon the closing of the contacts 106a of the triggering relay 106, a heavy duty relay 108 is energized. The closing of the contacts 108 of this heavy duty relay 108 energizes the motor 97 for the endless conveyor 2 to permit it to move the article from the feed-in roller table 6 in order that it may be weighed.

Once the article has passed the light source 102, thus allowing the light to fall upon the triggering photoelectric tube 100, the heavy duty relay 108 will be deenergized through the contacts 106a of the triggering relay 106; thus opening the circuit to the motor 97 for the endless conveyor 2.

As will be readily appreciated, the apparatus of the present invention must be so operated that but one article, or unitary groups thereof, is on the (scale-carried) endless conveyor 2 at one time; this, of course, to permit proper weighing, and also to prevent jamming of articles when the endless conveyor 2 is in a right-angular, or "reject," relationship with respect to the correct-weight discharge conveyor 8. Assurance of such a mode of operation is provided by maintaining the operation of the motor (not shown) for the power-driven feed-in conveyor 6 until the light rays from the light source 102 are again permitted to fall upon the triggering photoelectric tube 100. That is, when the article (or unitary group of a plurality thereof) interrupts the light ray to the triggering photoelectric tube 100, the relay 108 is energized, whereupon its contacts 108B close to energize the relay 110, the contacts 108A closing the circuit which was opened by the contacts 110A of the relay 110. Upon the restoration of light to the triggering photoelectric tube 100, the relay 108 becomes deenergized, thus opening its contacts 108A. The relay 110 remains energized through contacts 112A, and through holding contacts 110C. At this point, the circuit to the motor (not shown) for the power-driven feed-in conveyor is now open, thus discontinuing its operation while the article is being weighed on the (scale-carried) endless conveyor 2.

An additional function of the triggering photoelectric tube 100 is to actuate a circuit delay-timer 114. This is done when the triggering relay 106 is energized. Contacts 106B connect a timing capacitor 118 to the grid of the tube of the circuit delay timer and connect in parallel with an adjustable resistor 120 which adjusts the interval desired for the timing circuit. A circuit delay timer relay 122 opens the high voltage current supply to D. C. amplifiers 124, 126 and 128, and also opens the current supply to the conveyor motor timer tube 130 through contacts 122A.

With contacts 122A in energized position, high voltage is supplied to the timing capacitor 132 through contacts 112C.

The contacts 122B are charging contacts for the timing capacitor 118 when in a deenergized position. When in energized position, the contacts 122B are holding contacts. These are necessary to maintain operation after the triggering relay 106 has been denergized.

The light source 46 for the three superposed photoelectric tubes 40, 42 and 44 is placed in operation by the relay 110 through contacts 110B. The light source 46 remains in operation until the timer relay 112 for the scale conveyor motor 97 is energized. The contacts 112A, when in energized position, open the circuit to the relay 110 which operates the light source 46.

After the article (or unitary group thereof) has been placed on the scale-carried endless conveyor 2 and the circuit delay timer 114 holds the D. C. amplifiers inoperative, the pendulum 22 comes to rest; and the mirror 32 reflects light from the light source 46 to one of three selecting photoelectric tubes, either tube 42, 40 or 44, depending upon the weight of the article.

In order to eliminate "dead spots" caused by space between the photoelectric tubes 42, 40 and 44, the beam of light which is reflected thereonto by the mirror is made to cover approximately two of said tubes at the same time. The reason that two circuits are not acted upon at once is because one circuit opens the circuit to the other. For example, with the range switch 140 in "A" position and the light beam covering photoelectric tubes 40 and 44 at the same time, the supply voltage to the "accept" relay 144 is placed in series with the contacts 146D of the "underweight" relay 146. Thus, when the light beam is on both of photoelectric tubes 40 and 44, the underweight circuit (44 and 128); and relay 146 will take preference over "accept" circuit (40 and 126) and relay 144. By throwing the range switch 140 into "B" position, the reverse situation will obtain: meaning, of course, that the accept circuit (40 and 126) and relay 144 would take preference over the "underweight" circuit (44 and 128) and relay 146.

The position "A" of the range switch 140 is narrower than the position "B" thereof.

Accordingly, the circuit is put into operation by light reflection onto one of the three superposed photoelectric tubes 42, 40 and 44 to either (a) reject for overweight, through photoelectric tube 42; D. C. amplifier 124, relay 150, etc.;

(b) accept for weight within allowable range, through photoelectric tube 40, D. C. amplifier 126, relay 144, etc.; or (c) reject for underweight, through photoelectric tube 44, D. C. amplifier 128, relay 146, etc.

*When the weight of the article or commodity upon the (scale-carried) endless conveyor 2 is within an acceptable range, or tolerance*

The light beam impinging upon the photoelectric tube 40 causes a voltage charge across it which is amplified by the D. C. amplifier 126, thus energizing the relay 144, whereupon contacts 144A connect timing capacitor 132 to the grid of the timer tube 130 for the conveyor motor 97, also putting timing capacitor 132 in parallel with a variable resistor 152, which is a time adjustment for the timer tube 132. This action causes the timing relay 112 to close the circuit to the conveyor motor 97 through contacts 112A. Also when contacts 112A are in an energized position, the circuit to the light relay 110 is opened, thus discontinuing the light source 46. The contacts 112B are holding contacts for the timer, to thereby allow the latter to complete its cycle of operation. The contacts 112C open the charging circuit to the timing capacitor 132 when in their energized position.

*When the weight of the article or commodity is underweight*

The light beam impinging upon the photoelectric tube 44 causes a voltage charge across it which is amplified by the D. C. amplifier 128, thus energizing the relay 146. Contacts 146B energize a heavy duty relay 154 whose contacts 154B effect the starting of the turntable motor 61. When energized the contacts 154A will put into series relationship with the solenoid 89 a switch 156 which is held closed when the switch-operating horizontal arm 77 of the turntable 59 is in normal, or "accept" position. Thus, the solenoid 89 is energized concurrently with the turntable motor 61.

Once the turntable arm 77 has moved from normal "accept" position, the switch 156 is opened, thus deenergizing the solenoid 89. This permits the dog 85 on the lever 83 to ride the outer surface of the clutch 65. By riding the surface of clutch 65, the dog 85 will engage the aforementioned trip lever within the clutch; and, when the clutch has rotated 360°, the large crank gear 71 becomes disengaged from its prime mover turntable motor 61. Upon reaching "reject" position, the turntable arm 77 opens a switch 158 which is in series with the turntable motor 61, at which time the endless conveyor 2 is at right angles to the power-driven feed-in conveyor 6; and in position to discharge the reject commodity or article.

When the turntable arm 77 is in "reject" position, it closes a switch 160, thus completing the circuit from relay contacts 146A to timing capacitor 132 to the grid of the timer tube 130 of the motor 97, thereby setting said motor 97 in operation to discharge the rejected commodity.

As shown at 164, there is provided a manually operated switch whose function is to select the side of the scale from which the particular rejected commodity is to be discharged.

With switch 164 in position A, the reversing relay 176 of the conveyor motor 97 is not energized by the relay contacts 146C. Thus, the underweight reject commodity would be ejected to the left, when viewed from the receiving end of the scale.

Should switch 164 be in position B, contacts 146C would energize the scale-conveyor motor reversing relay 176. Accordingly, should it be desired to reject an overweight commodity to the left and to reject the underweight commodity to the right, switch 164 must be in position "B." Should the reverse procedure be desired, switch 164 must be in position "A."

Once the rejected commodity has been discharged, relay contacts 112A are again returned to deenergized position, closing the circuit to the turntable motor 61 through the contacts of the turntable return relay 166, which is energized by contacts 112A (being in deenergized position) in series with the contacts 154C (being in deenergized position caused by the shutting off of the light source 46 and the closing of a switch 168 by the turntable arm 77).

The relay 154 being again deenergized has caused contacts 154A to connect the current supply to the solenoid 89 through a switch 170 which closes when the turntable arm 77 is in reject position. Again (as was the case when the turntable arm left normal or "accept" position), the action of the switch 170 is to deenergize the solenoid 89 shortly after the clutch 65 has begun to rotate, so that the dog 85 on the end of the lever 83 can ride the peripheral surface of the clutch, thus allowing the said dog to engage with the uncoupling trip lever (within the clutch) at the end of the 360° turn of said clutch, thus disengaging the crank gear 71 and bringing the turntable arm 77 back to normal or "accept" position.

While in reject position, turntable arm 77 permits the opening of a switch 174 which has the effect of rendering inoperative the triggering circuit photoelectric tube 100, D. C. amplifier 104 and relays 106 and 108. This is necessary to prevent triggering circuit from being acted upon when the reversing relay 176 is energized, thus causing the rejected commodity to again pass the triggering photoelectric tube 100. When the turntable arm 77 has again reached normal position, the switch 174 is pushed closed, thus putting the triggering circuit back in operating condition.

A time-delay capacitor 178 is provided to hold relay 146 energized a short time after the light beam to photoelectric tube 44 has been shut off. This is attained in the following manner: When the D. C. amplifier 128 is conducting, the capacitor 178 is discharged, it being in parallel therewith. Thus, when the D. C. amplifier tube 128 is conducting, the capacitor 178 discharges through the amplifying tube which is connected to the relay 146. After the light beam has been shut off from the photoelectric tube 44, and the D. C. amplifier 128 is no longer conducting, the capacitor 178 begins to charge, thus causing a current flow through the relay 146. The capacitor 180, D. C. amplifier 124 and relay 150 have the same function as outlined for the D. C. amplifier 128, capacitor 178 and relay 146.

The reason that a small time delay is desired for underweight relay 146, and also overweight relay 150, is in order to hold closed the circuit to the conveyor motor reversing relay 176 to keep it energized until contacts 112A of the timer relay for the scale-conveyor motor have moved from deenergized position to energized position. In this manner, then, the reversing relay 176 is held in an energized position as long as scale-conveyor motor timer relay 112 is energized.

Operation of the overweight reject circuit photoelectric tube 42, D. C. amplifier 124 and relay 150 are the same as described for the underweight circuit photoelectric tube 44, D. C. amplifier 128 and relay 146, with the exception that, the switch 184 being in "B" position, D. C. amplifier 124 and relay 150 do not function when the light beam is focused on the photoelectric tube 42. The photoelectric tube 42 is in parallel with the underweight photoelectric tube 44; thus, when light strikes either of them, the D. C. amplifier 128 will be acted upon. Therefore, with the switch 184 in "B" position, both overweight and underweight commodities will be rejected from the scale conveyor in the same direction. With switch 184 in "B" position, either right or left sides may be chosen to eject rejected commodities by operation of the switch 164. Should switch 164 be in position "A," the rejected commodity would be ejected to the left, when viewed from the receiving end of the scale. However, with the switch 164 in "B" position, the rejected commodity would be ejected to the right.

According to a preferred embodiment, the motor (not shown) for the feeder conveyor 6 is connected in series with the terminal board 186. Before the article or commodity reaches the scale conveyor 2, the circuit for the feeder conveyor motor is held closed by switch 190 (turntable arm 77 being in normal or "accept" position) in series with the then deenergized relay contacts 110A.

However, when triggering photoelectric tube 100 is set off by an article breaking the light beam to it, relay 108 is caused to be energized through relay contacts 106A. Contacts 108A maintain closed circuit to the feeder conveyor motor which would have been opened by relay contacts 110A which are energized at the same time that relay 108 is energized. When the article or commodity has passed photoelectric tube 100 allowing light beam to be restored to it, the relays 106 and 108 are caused to be deenergized. Relay 110, however, remains energized through holding contacts 110C and contacts 112A (being in deenergized position at this point of operation). Thus, the circuit is now opened, thereby stopping the feeder conveyor motor. When the timer relay 154 becomes energized, contacts 154A open the circuit to the relay 110, and this causes feeder conveyor motor to resume operation. Whenever the turntable arm 77 is not in normal or "accept" position, the safety switch 190 is open to prevent the feeder conveyor from operating while the endless (scale) conveyor 2 is not in line with the feed-in conveyor 6.

Overweight reject relay 150 compares with underweight reject relay 146 (described earlier in this description) in the following manner: Contacts 150C have the same function (when overweight relay 150 is put into operation) as contacts 146A. That is, to set off the scale conveyor motor timer 130 when the turntable arm 77 reaches reject position. Contacts 150A have the same operational function as contacts 146B under the conditions as stated above; that is, to energize relay 154. And the contacts 150B have the same function as contacts 146C under these same conditions. That is, to energize reversing relay 176 when the manually operated switch 164 is in position "A." However, should switch 164 be in position "B," contacts 150B are put out of the circuit to the reversing relay 176. Contacts 150D have the same function as 146D, namely, to open the circuit to the "accept" relay 144 circuit when the range switch 140 is in position "A" (narrow range).

While we have shown and described certain specific embodiments of the present invention, it will be readily understood by those skilled in the art that we do not wish to be limited exactly thereto, since various modifications may be made without departing from the scope of the invention as defined in the appended claims.

We claim:

1. Apparatus for weighing and classifying articles and commodities comprising a conveyor for advancing the articles or commodities, means for driving said conveyor, a weighing scale having a movable balance member, a turntable carried solely by said movable balance member, an article-receiving endless belt conveyor carried by said turntable and forming a part of a conveyor system over which the articles are moved from said first-named conveyor, a motor for driving said endless belt conveyor, a conveyor disposed to receive articles from said endless belt conveyor when it is in alignment with said first-named conveyor, said turntable and the endless belt conveyor carried thereby being movable into a position which is at an acute angle with respect to said first-named conveyor, a conveyor disposed for alignment with the discharge end of said endless belt conveyor when it and said turntable are rotated into the acute angular relationship aforesaid, means for continuing the straight-forward movement of said endless belt conveyor when the articles or commodities are of acceptable weight, and means for rotating said turntable and said endless belt conveyor into the aforementioned relationship if said article or commodity is of unacceptable weight.

2. Apparatus for weighing and classifying articles and commodities comprising a conveyor for advancing the articles or commodities, means for driving said conveyor, a weighing scale having a movable balance member, a turntable carried solely by said movable balance member, an article-receiving endless belt conveyor carried by said turntable and forming a part of a conveyor system over which the articles are moved from said first-named conveyor, a motor for driving said endless belt conveyor, a conveyor disposed to receive articles from said endless belt conveyor when it is in alignment with said first-named conveyor, said turntable and the endless belt conveyor carried thereby being movable into a position which is at an acute angle with respect to said first-named conveyor, a conveyor disposed for alignment with the discharge end of said endless belt conveyor when it and said turntable are rotated into the acute angular relationship aforesaid, means for discontinuing the operation of said first-named conveyor while an article or commodity is being weighed on said endless belt conveyor, means for continuing the straight-forward movement of said endless belt conveyor when the articles or commodities are of acceptable weight, and means for rotating said turntable and said endless belt conveyor into the aforementioned relationship if said article or commodity is of unacceptable weight.

3. Apparatus for weighing and classifying articles and commodities comprising a conveyor for advancing the articles or commodities, means for driving said conveyor, a weighing scale having a movable balance member, a turntable carried solely by said movable balance member, an article-receiving endless belt conveyor carried by said turntable and forming a part of a conveyor system over which the articles are moved from said first-named conveyor, a motor for driving said endless belt conveyor, a conveyor disposed to receive articles from said endless belt conveyor when it is in alignment with said first-named conveyor, said turntable and the endless belt conveyor carried thereby being movable into a position which is at an acute angle with respect to said first-named conveyor, a conveyor disposed for alignment with the discharge end of said endless belt conveyor when it and said turntable are rotated into the acute angular relationship aforesaid, a conveyor disposed in alignment with said last-named conveyor and at the opposite end of said endless belt conveyor when it and said turntable are in the aforementioned angular relationship, means for continuing the straight-forward movement of said endless belt conveyor when the articles or commodities are of acceptable weight, means for rotating said turntable and said endless belt conveyor into said acute angular relationship with respect to said first-named conveyor if said article or commodity is of unacceptable weight, means cooperating with said last-named means for moving said endless belt forwardly when said last-named condition prevails, and means for reversing the direction of movement of said endless belt conveyor when still a third weight condition prevails.

4. Apparatus for weighing and classifying articles and commodities comprising a conveyor for advancing the articles or commodities, means for driving said conveyor, a weighing scale having a movable balance member, a turntable carried solely by said movable balance member, an article-receiving endless belt conveyor carried by said turntable and forming a part of a conveyor system over which the articles are moved from said first-named conveyor, a motor for driving said endless belt conveyor, a conveyor disposed to receive articles from said endless belt conveyor when it is in alignment with said first-named conveyor, said turntable and the endless belt conveyor carried thereby being movable into a position which is at an acute angle with respect to said first-named conveyor, a conveyor disposed for alignment with the discharge end of said endless belt conveyor when it and said turntable are rotated into the acute angular relationship aforesaid, a conveyor disposed in alignment with said last-named conveyor and at the opposite end of said endless belt conveyor when it and said turntable are in the aforementioned angular relationship, means for discontinuing the operation of said first-named conveyor while an article or commodity is being weighed on said endless belt conveyor, means for continuing the straight-forward movement of said endless belt conveyor when the articles or commodities are of acceptable weight, means for rotating said turntable and said endless belt conveyor into said acute angular relationship with respect to said first-named conveyor if said article or commodity is of unacceptable weight, means cooperating with said last-named means for moving said endless belt forwardly when said last-named condition prevails, and means for reversing the direction of movement of said endless belt conveyor when still a third weight condition prevails.

5. Apparatus for weighing and classifying articles and commodities comprising a conveyor for advancing the articles or commodities, means for driving said conveyor, a weighing scale having a movable balance member, a turntable carried solely by said movable balance member, an article-receiving endless belt conveyor carried by said turntable and forming a part of a conveyor system over which the articles are moved from said first-named conveyor, a motor for driving said endless belt conveyor, a conveyor disposed to receive articles from said endless belt conveyor when it is in alignment with said first-named conveyor, said turntable and the endless belt conveyor carried thereby being movable into a position which is at substantial right-angles with respect to said first-named conveyor, a conveyor disposed for alignment with the discharge end of said endless belt conveyor when it and said turntable are rotated at right-angles with respect to said first-named conveyor, means for continuing the straight-forward movement of said endless belt conveyor when the articles or commodities are of acceptable weight, and means for rotating said turntable and said endless belt conveyor at right-angles to said first-named conveyor if said article or commodity is of unacceptable weight.

6. Apparatus for weighing and classifying articles and commodities comprising a conveyor for advancing the articles or commodities, means for driving said conveyor, a weighing scale having a movable balance member, a turntable carried solely by said movable balance member, an article-receiving endless belt conveyor carried by said turntable and forming a part of a conveyor system over which the articles are moved from said first-named conveyor, a motor for driving said endless belt conveyor, a conveyor disposed to receive articles from said endless belt conveyor when it is in alignment with said first-named conveyor, said turntable and the endless belt conveyor carried thereby being movable into a position which is at substantial right-angles with respect to said first-named conveyor, a conveyor disposed for alignment with the discharge end of said endless belt conveyor when it and said turntable are rotated at right-angles with respect to said first-named conveyor, means for discontinuing the operation of said first-named conveyor while an article or commodity is being weighed on said endless belt conveyor, means for continuing the straight-forward movement of said endless belt conveyor when the articles or commodities are of acceptable weight, and means for rotating said turntable and said endless belt conveyor at right-angles to said first-named conveyor if said article or commodity is of unacceptable weight.

7. Apparatus for weighing and classifying articles and commodities comprising a conveyor for advancing the articles or commodities, means for driving said conveyor, a weighing scale having a movable balance member, a turntable carried solely by said movable balance member, an article-receiving endless belt conveyor carried by said turntable and forming a part of a conveyor system over which the articles are moved from said first-named conveyor, a motor for driving said endless belt conveyor, a conveyor disposed to receive articles from said endless belt conveyor when it is in alignment with said first-named conveyor, said turntable and the endless belt conveyor carried thereby being movable into a position which is at substantial right-angles with respect to said first-named conveyor, a conveyor disposed for alignment with the discharge end of said endless belt conveyor when it and said turntable are rotated at right-angles with respect to said first-named conveyor, a conveyor disposed in alignment with said last-named conveyor and at the opposite end of said endless belt conveyor when it and said turntable are in the aforesaid right-angular position, means for continuing the straight-forward movement of said endless belt conveyor when the articles or commodities are of acceptable weight, and means for rotating said turntable and said endless belt conveyor at right-angles to said first-named conveyor if said article or commodity is of unacceptable weight, means cooperating with said last-named means for moving said endless belt forwardly when said last-named condition prevails, and means for reversing the direction of movement of said endless belt conveyor when still a third weight condition prevails.

8. Weighing and classifying apparatus comprising a conveyor for advancing the articles or commodities to be weighed and classified, means for driving said conveyor, a weighing scale having a movable balance member, a turntable carried solely by said movable balance member, an article-receiving endless belt conveyor carried solely by said turntable and forming a part of a conveyor system over which the articles are moved from said first-named conveyor, a motor for driving said endless belt conveyor, a conveyor disposed to receive articles from said endless belt conveyor when it is in alignment with said first-named conveyor, said turntable and the endless belt conveyor carried thereby being movable into a position which is at substantial right-angles with respect to said first-named conveyor, a conveyor disposed for alignment with the discharge end of said endless belt conveyor when it and said turntable are rotated at right-angles with respect to said first-named conveyor, a conveyor disposed in alignment with said last-named conveyor and at the opposite end of said endless belt conveyor when it and said turntable are in the aforesaid right-angular position, means for discontinuing the operation of said first-named conveyor while an article or commodity is being weighed on said endless belt conveyor, means for continuing the straight-forward movement of said endless belt conveyor when the articles or commodities are of acceptable weight, means for rotating said turntable and said endless belt conveyor at right-angles to said first-named conveyor if said article or commodity is of unacceptable weight, means cooperating with said last-named means for moving said endless belt forwardly when said last-named condition prevails, and means for reversing the direction of movement of said endless belt conveyor when still a third weight condition prevails.

No references cited.